Nov. 11, 1924.

G. M. GOETHE 1,515,436

FLITCH MACHINE

Filed Sept. 29, 1920

INVENTOR.
G.M.Goethe

BY
ATTORNEY.

Nov. 11, 1924.

G. M. GOETHE

FLITCH MACHINE

Filed Sept. 29, 1920

INVENTOR.
G.M.Goethe
BY
ATTORNEY.

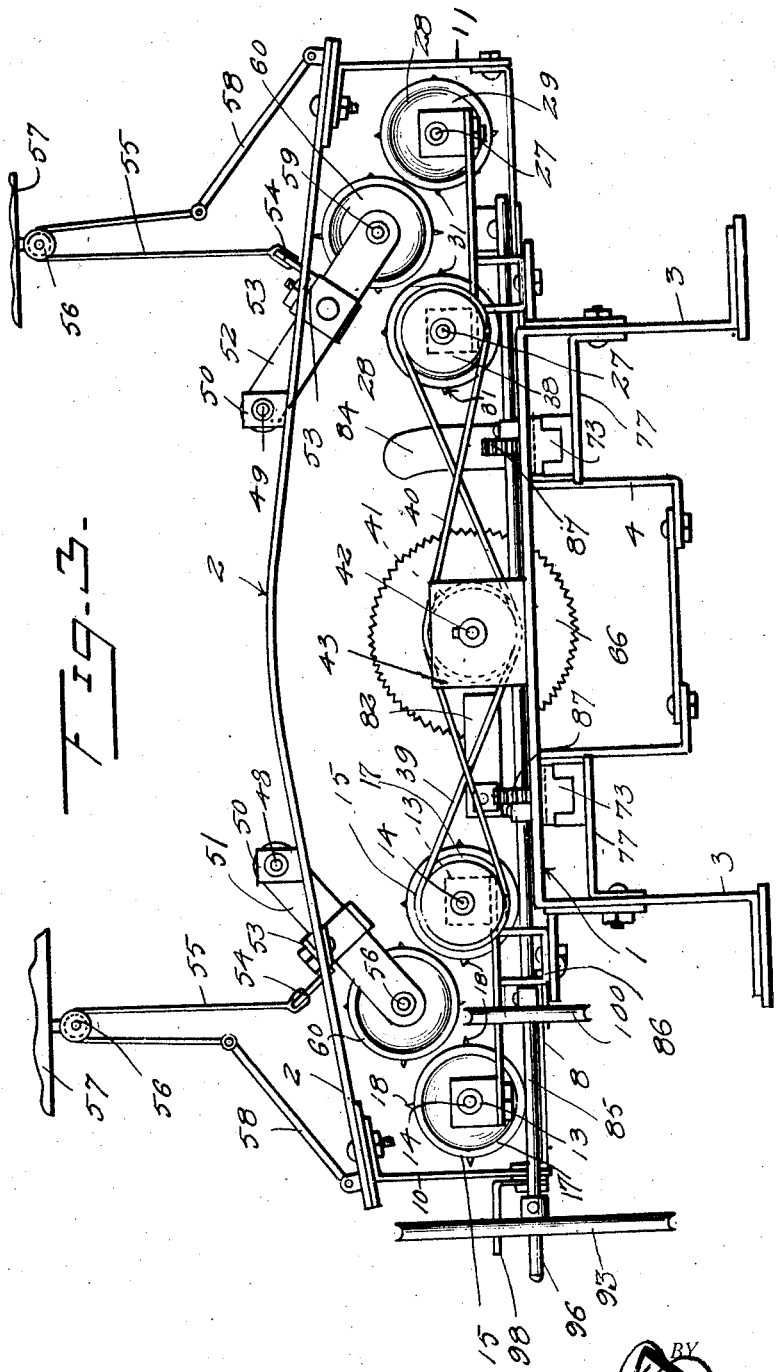

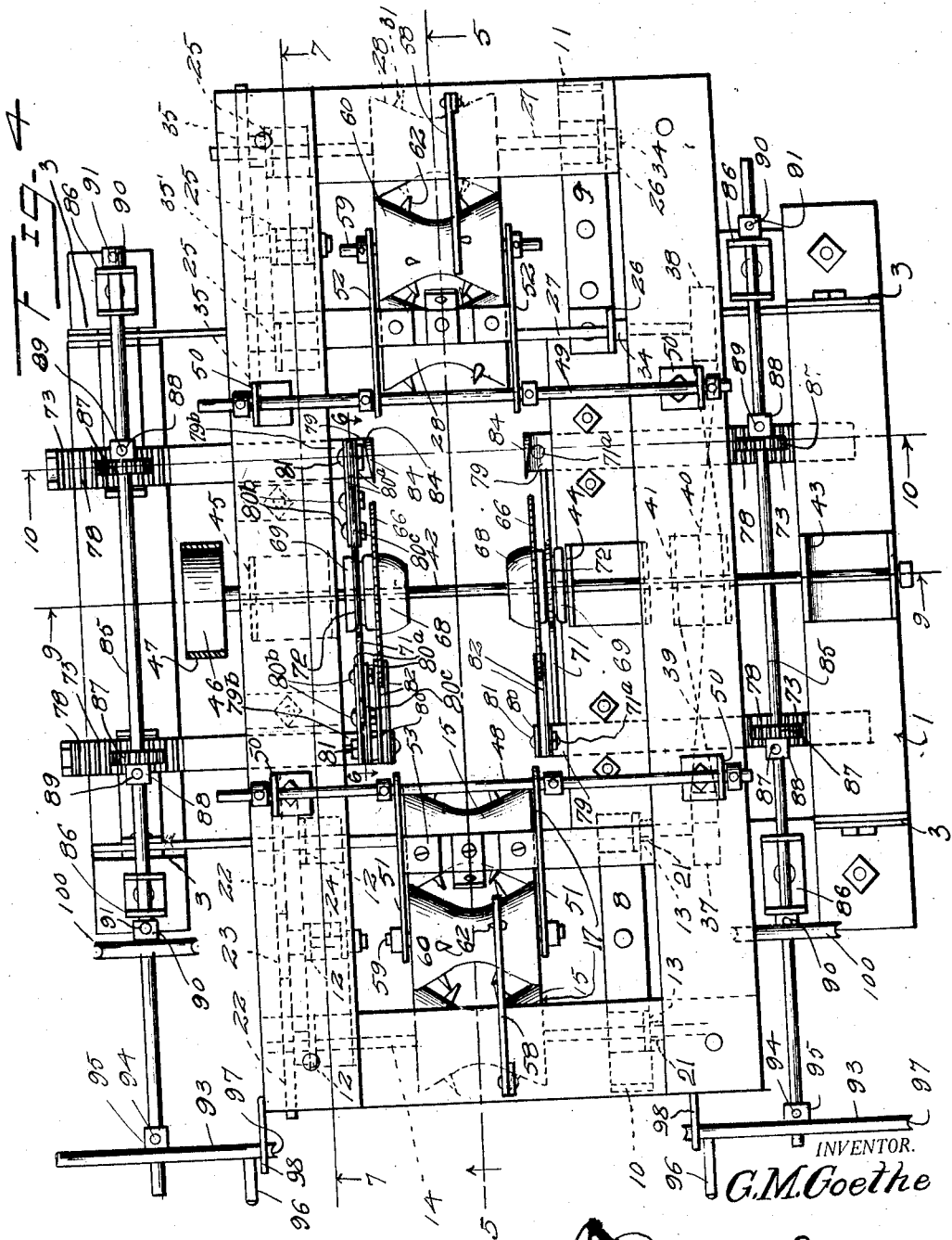

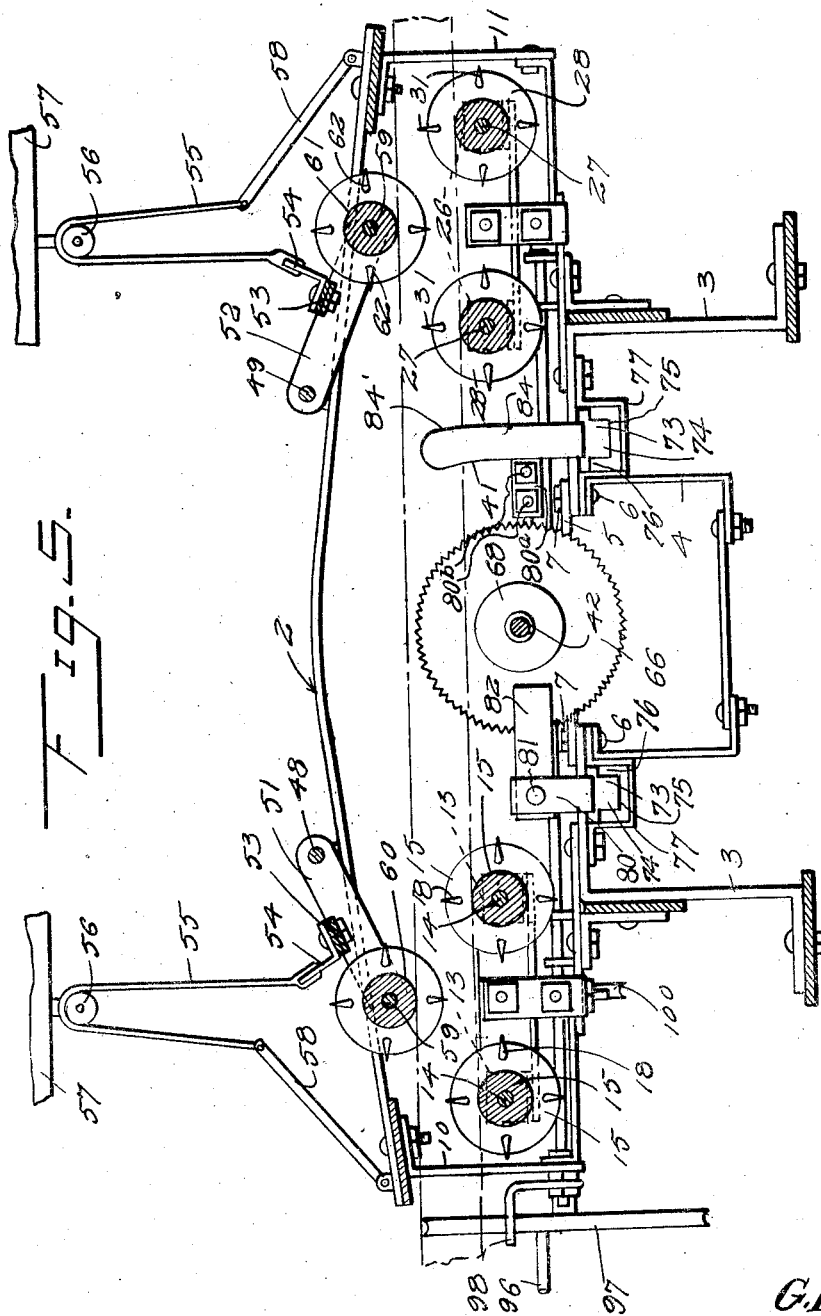

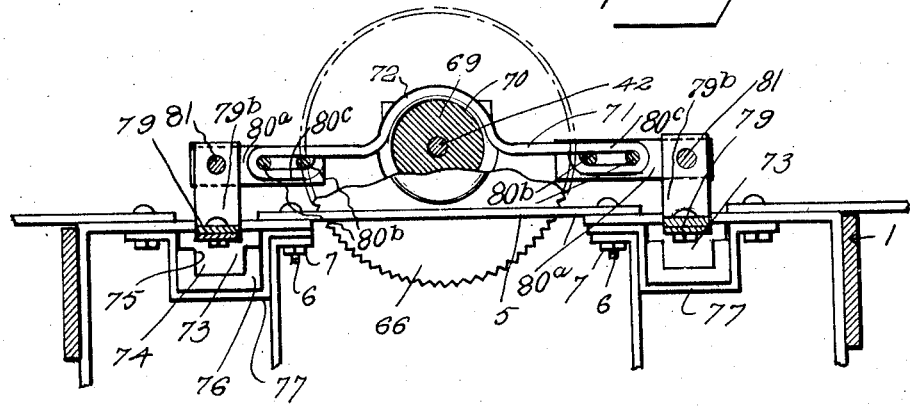

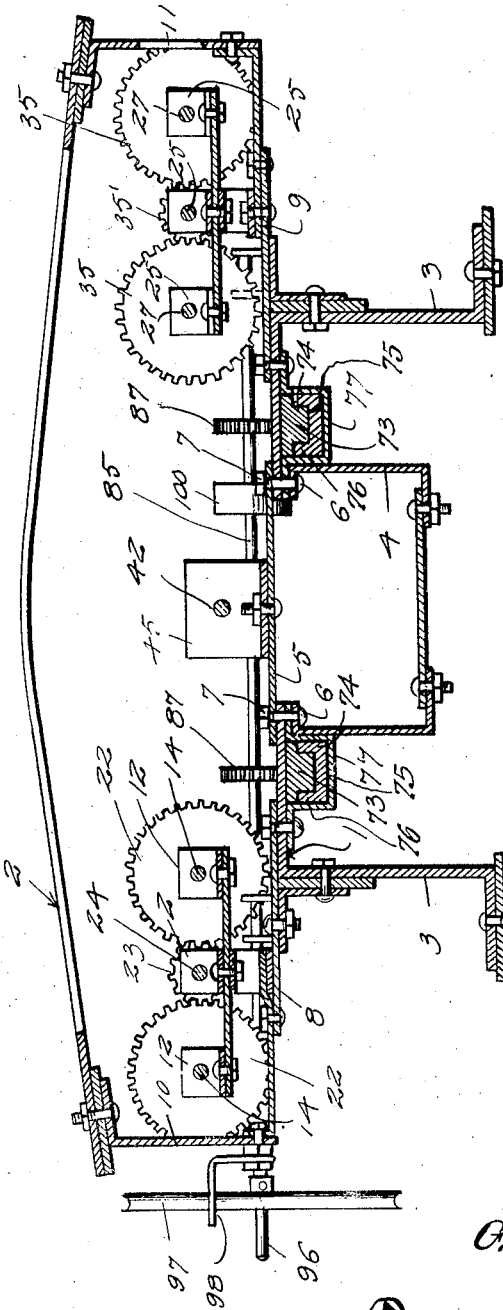

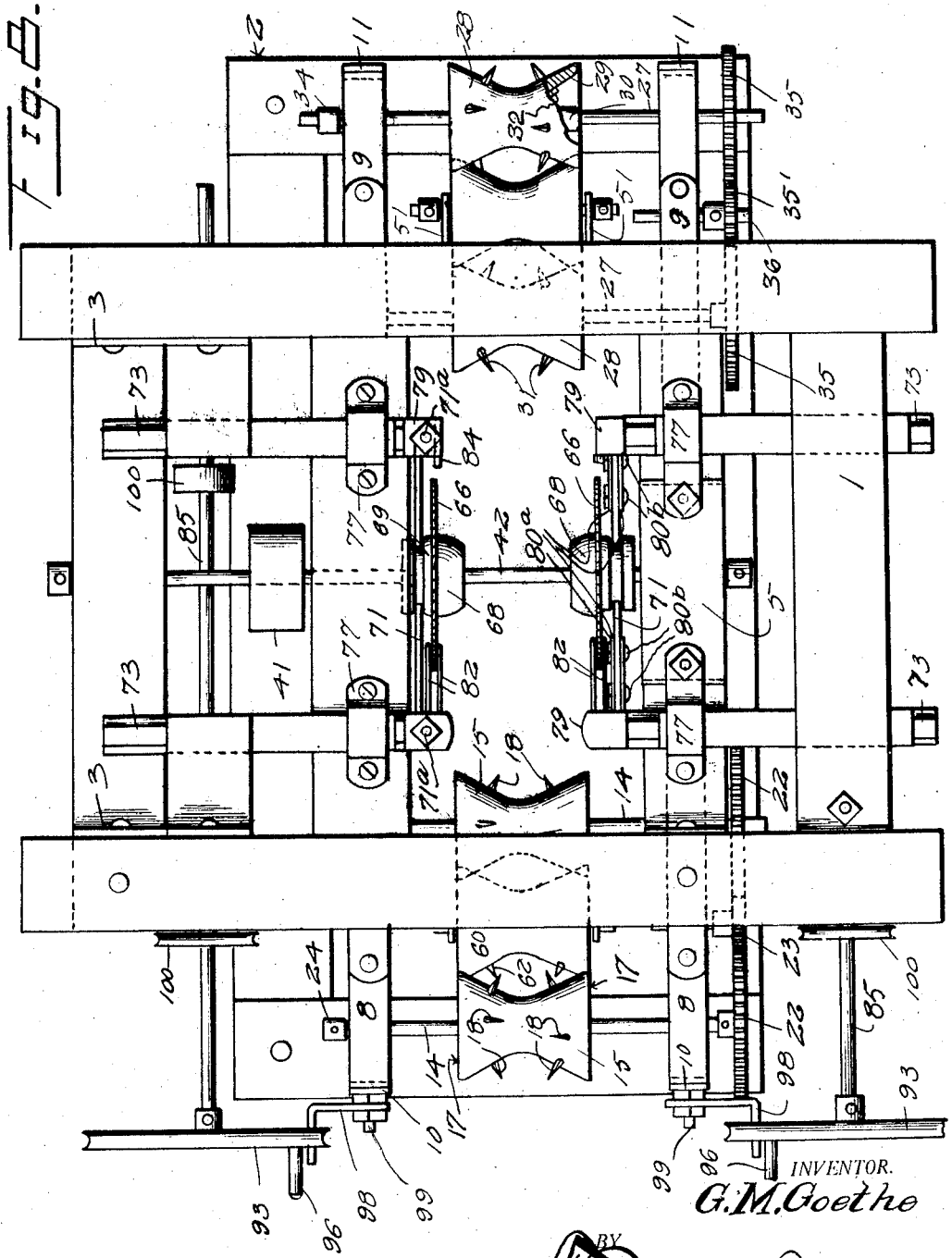

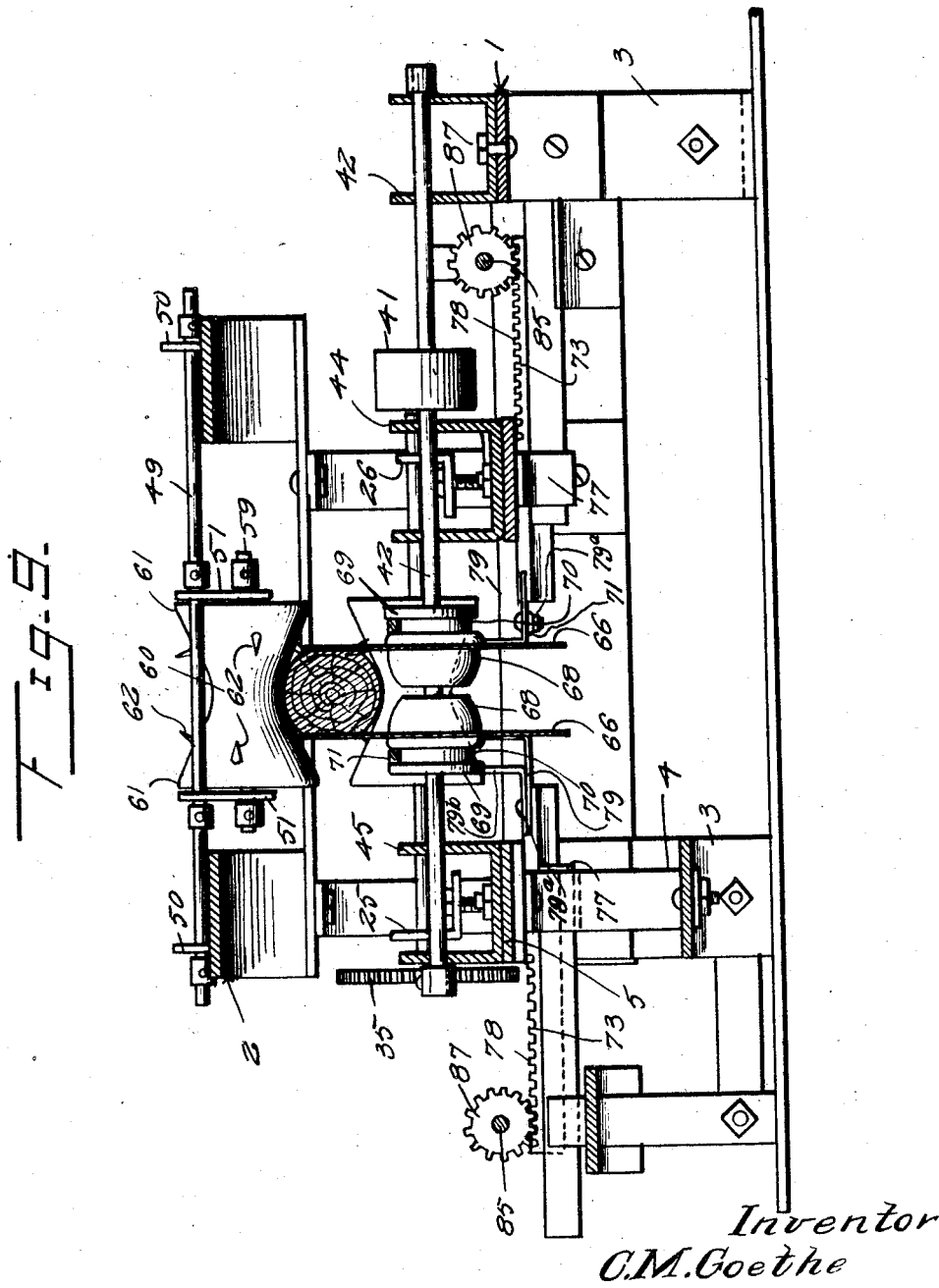

Nov. 11, 1924.  1,515,436
G. M. GOETHE
FLITCH MACHINE
Filed Sept. 29, 1920   11 Sheets-Sheet 10
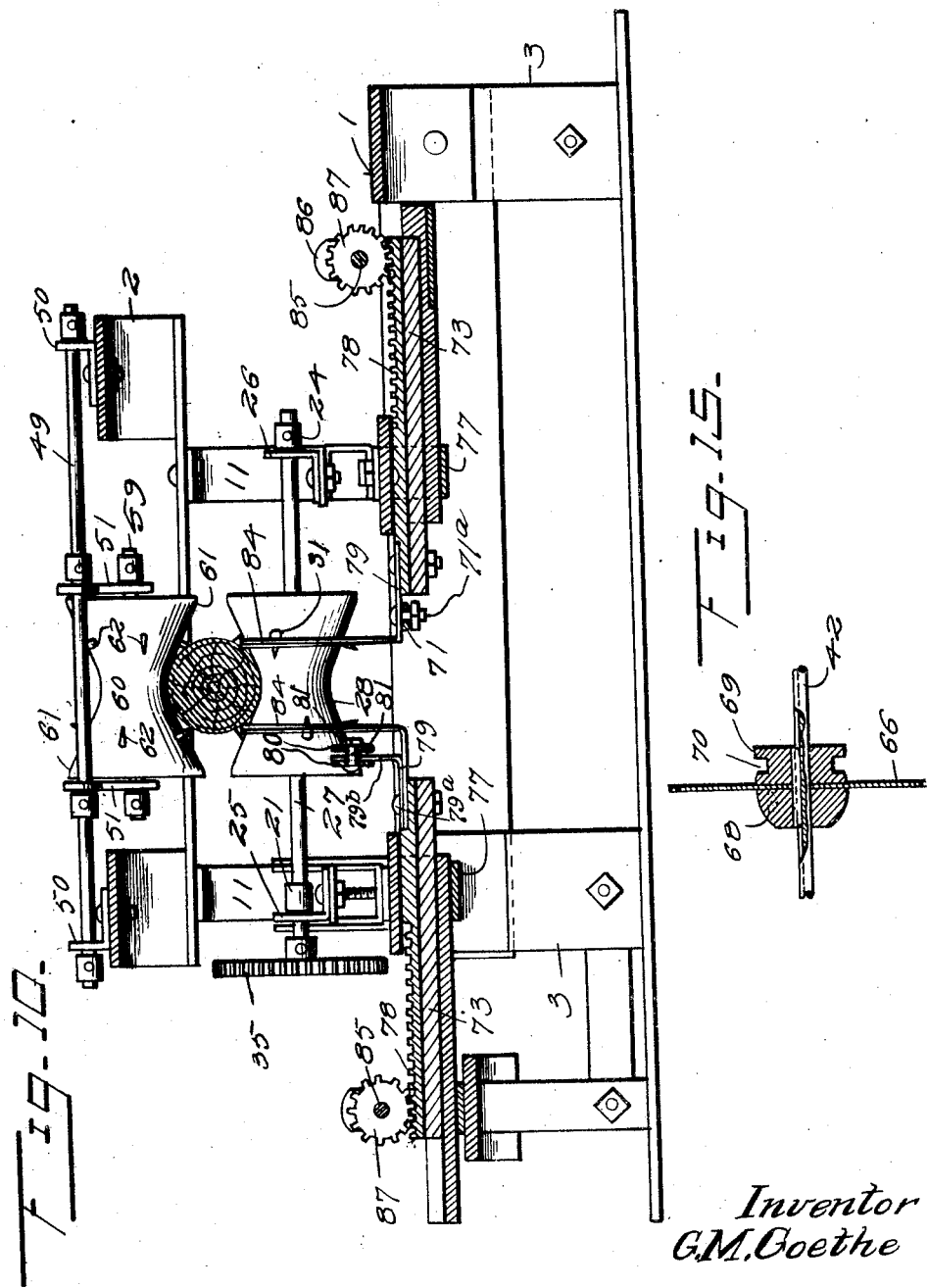
Inventor
G.M.Goethe
By [signature] Atty Nov. 11, 1924.
G. M. GOETHE
FLITCH MACHINE
Filed Sept. 29, 1920
1,515,436
11 Sheets-Sheet 11
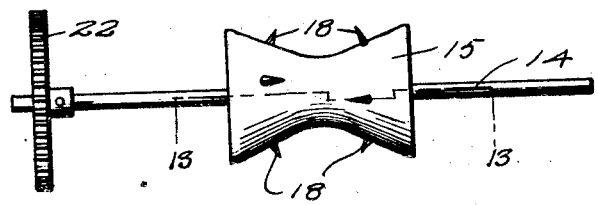
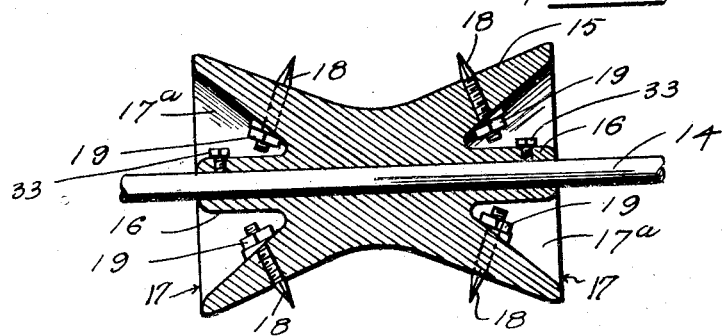
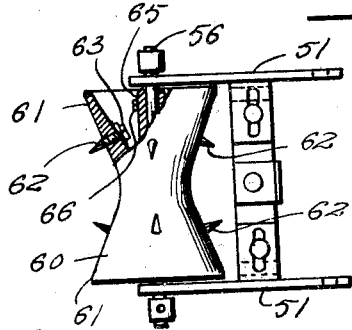
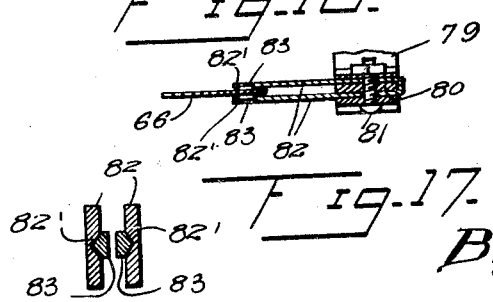
Inventor
G.M.Goethe Patented Nov. 11, 1924.

1,515,436

UNITED STATES PATENT OFFICE.

GEORGE M. GOETHE, OF JACKSONVILLE, FLORIDA.

FLITCH MACHINE.

Application filed September 29, 1920. Serial No. 413,535.

*To all whom it may concern:*

Be it known that I, GEORGE M. GOETHE, a citizen of the United States, residing at Jacksonville, in the county of Duval and State of Florida, have invented certain new and useful Improvements in Flitch Machines; and I do hereby declare the following to be a full, clear, and exact description of the invention, such as will enable others skilled in the art to which it appertains to make and use the same.

This invention has relation to certain new and useful improvements in a flitch machine and has for its primary object the provision of a machine of the character stated which will be constructed in such a manner as to be employed in connection with the regular carriage of a saw mill for making flitches for gang saws or rift machines.

The invention has for another object the provision of a machine of the character stated which may be installed in front, to the left or right of the present gang saws or rift machines and in front of a log haul up, to be supplied with logs from the haul up, which are kicked out of the haul up to live rolls, which convey the logs direct to one side of the machine and which logs may then be fed through machines to cut or strip the logs on both sides with one operation and one movement of the logs through the machine.

The invention has for a further object the provision of a machine of the character stated in which the feed rolls may be readily reversed, started, or stopped when necessary and in which the saws may be readily adapted to cut both sides of the log as desired.

The invention has for a still further object the provision of a flitch machine of the character stated in which the flitch or two sided timber may be produced with greater efficiency and in less time than heretofore, thereby greatly reducing the cost of operation of producing a flitch as heretofore performed on the carriage, the logs to be selected from smoother and straighter ones which are to be cut short for boards, rifts, small dimensions, or framing.

The invention has for a still further object the provision of a machine of the character stated which will be constructed for operation in such a manner that the number of attendants required will be considerably decreased and in which the logs may be cut on both sides in a single operation of the machine to carry the logs through in one direction.

The invention has for still another object the provision of a machine of the character stated which, when made in a smaller size will be especially adapted for use in a lath mill, stave mill or cooperage plant, where material is prepared for gang saws, the new machine serving to save time, labor and expense in place of carrying the logs to the carriage several times to accomplish the same purpose, as heretofore, the present machine completing the work in a single operation and without return of the timber or log as the same is ready for the gang saws when completing its first travel through the machine.

The invention has for a still further object the provision of a machine of the character stated which will be of improved and simplified construction and in which the adjustable parts may be readily adjusted to proper position, as required.

With the foregoing and other objects in view as will appear as the description proceeds, the invention consists in the novel construction, combination and arrangement of cooperating elements as hereinafter set forth, shown in the accompanying drawings and claimed.

In the drawings forming a part of the present application:

Figure 3 is a side elevation, looking at the opposite side of the machine.

Figure 4 is a top plan view of the machine.

Figure 5 is a central longitudinal vertical section through the machine on the plane of line 5—5 of Figure 4, taken through the guide rollers and pressure rollers, looking in the direction indicated by the arrows.

Figure 6 is an enlarged detail longitudinal vertical section through a portion of the machine taken substantially on the plane of line 6—6 of Figure 4 and looking in the direction indicated by the arrows, said view being taken along the line of one of the saws and the spreading member rearwardly of the same.

Figure 7 is a longitudinal vertical section on the plane of line 7—7 of Figure 4, looking in the direction indicated by the arrows and showing the mounting of the feed roller bearings.

Figure 8 is a bottom plan view of the machine.

Figure 9 is a transverse section on the plane of line 9—9 of Figure 4, looking in the direction indicated by the arrows, said view being taken along the line of the saw shaft.

Figure 10 is a transverse vertical section on the plane of line 10—10 of Figure 4, said view being taken through one of the saw rack bars.

Figure 11 is a fragmental detail plan of one of the saws and the mounting therefor.

Figure 12 is a detail view of one of the feed rollers and the shafts and parts carried by the shafts.

Figure 13 is a detail longitudinal section through the feed roller shown in Figure 12 and taken on the plane of the line 13—13 of Figure 12.

Figure 14 is a detail view of one of the pressure rollers and the mounting therefor, removed from the machine.

Figure 15 is a detail sectional view through one of the saws.

Figure 16 is a detail view showing one of the saw guides mounted on the saw, said view being partly in section to show the bearing members engaging the sides of the saw body.

Figure 17 is an enlarged detail transverse section through the saw guide fingers showing the bearing members mounted therein.

Figure 1:
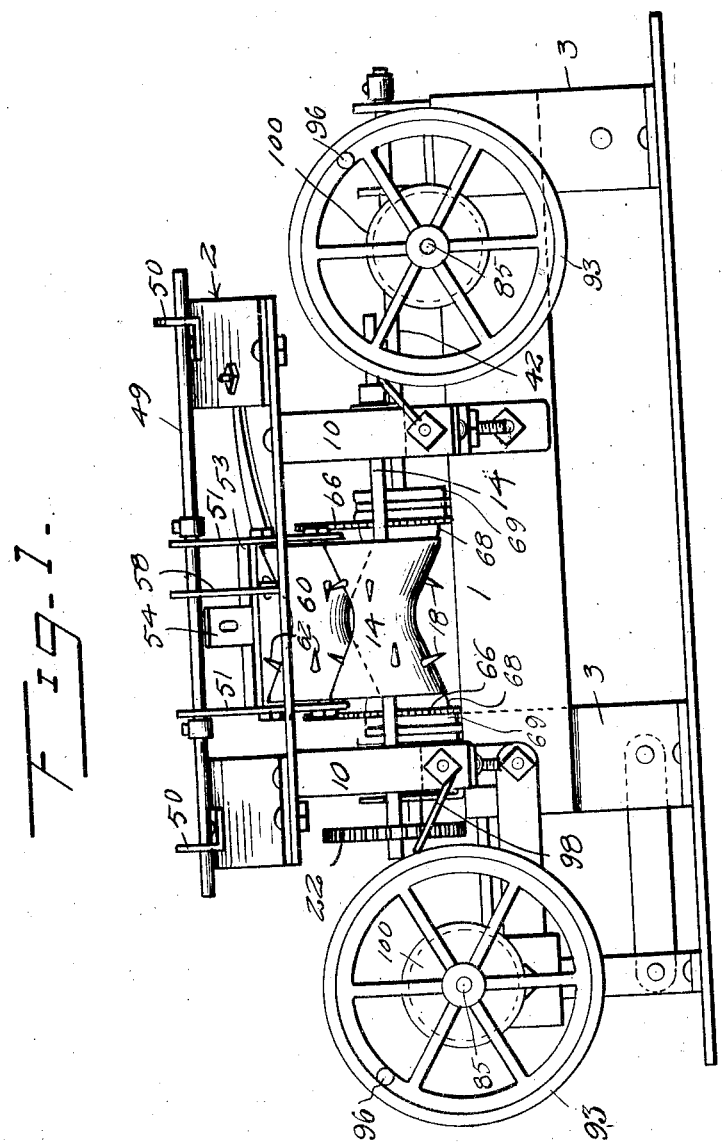
Figure 1 is a front elevation of the complete machine.
Figure 2:
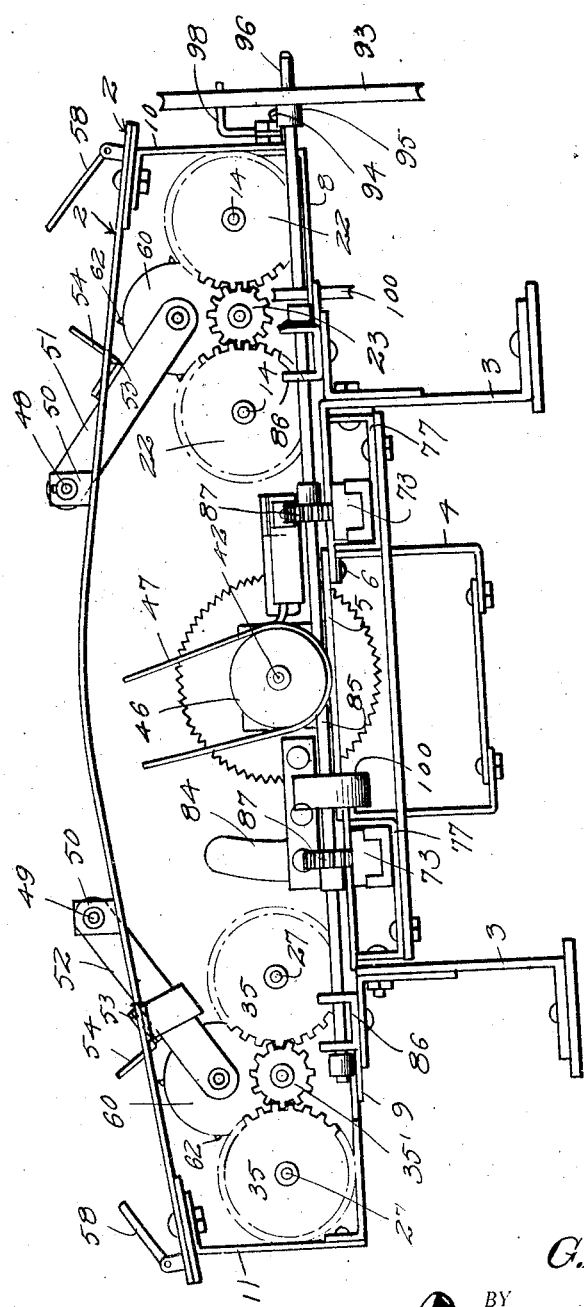
Figure 2 is a side elevation thereof looking at the left side.

Referring more in detail to the drawings in which similar reference characters designate corresponding parts throughout the several views, 1 indicates in general the lower frame and 2 the upper frame of the machine. The lower frame is supported by four corner legs designated by the numeral 3. Each of the frame members 1 and 2 are preferably formed of cast metal and the legs 3 are preferably cast with the lower frame 1. This lower frame 1 also has a depending portion 4 adjacent its right side and over which is extended the bearing supporting frame members 5 secured upon the main portion of the main frame 1 by suitable securing bolts 6 having nuts 7 provided therefor. The purpose of constructing this side portion of the frame 1 in this manner will presently appear. The main frame 1 is also provided with a pair of forwardly extended arms 8 forming a forward extension for the main frame while a similar pair of arms 9 are extended rearwardly from the main frame 1 to form a rear frame extension. The purposes of these forward and rear extensions of the main frame 1 will also be apparent as the description proceeds.

A pair of upstanding members 10 are connected with the forward extensions 8 while a pair of similar upstanding members 11 are connected with their rearwardly extending arms 9, said members 10 and 11 supporting the upper frame 2 a suitable distance above the lower or main frame 1, as will be readily understood by referring to the drawings. A series of three shaft bearing members 12 are mounted on the forwardly extending arm 8 to the left of the longitudinal center of the machine, a pair of shaft bearing members 13 are mounted on the forwardly extending arm 8 to the right of the longitudinal center of the machine. It will be understood that the pair of shaft bearings 13 are positioned opposite the bearings 12 to accommodate the pair of forward feed roller carrying shafts 14 extended therethrough and upon which are mounted the feed rollers 15. These feed rollers have reduced central portions and hollowed out ends with hub members 16 within the hollowed out ends which may be designated by the numeral 17. The pointed log engaging members 18 are extended through end flanges 17ᵃ of the feed roller 15, with nuts or the like 19 secured upon their inner ends within the hollowed out end portions 17 of the feed rollers 15. The pointed log engaging members 18 are extended through the flanges 17ᵃ and directed toward the center of the feed rollers 15 near the narrow central portions of said feed rollers. It will also be understood that the pointed members 18 project through from one end of the feed rollers 15 and are offset from those projecting through the opposite end of said feed rollers 15, as clearly shown in the drawings. It will be understood that suitable collars 21 are provided upon the shaft 14 to prevent the shaft from working out of the bearings 12 and 13. It will be understood that suitable gear wheels 22 are provided upon one end of the shaft 14, preferably the ends toward the right side of the machine and an intermediate gear 23 meshing with the gears 22 so as to rotate both of said gears 22 in the same direction. The gear 23 is mounted upon a stub shaft 24 carried in the central shaft bearing between the bearings for the right ends of the shafts 14, as clearly shown in the drawings.

A series of three shaft bearings 25 are mounted on the rearwardly directed arm to the right of the longitudinal center of the machine while a pair of spaced shaft bearings 26 are mounted on the remaining rearwardly extended arms extending to the left of the longitudinal center of the machine. The rear feed roller shafts 27 are mounted in the bearings 26 and the outer bearings 25 positioned opposite the same. These rear feed rollers 28 correspond in construction to the forward feed rollers 15 and have reduced central portions, thereby providing the flared ends 29 of hollow construction and within which are formed the hub portions 30 for supporting the rear feed roller 28 upon the shaft 27. The pointed log engaging members 31 extend through the end portions of the rear feed rollers 28 and are the same as those of the forward feed rollers 15. The pointed members of one end are offset from those carried by the opposite end of the feed rollers 28, as clearly shown in the drawings. The pointed members 31 have suitable nuts 32 on their inner ends within the hollowed out inner end portions 29 so as to secure said pointed members 31 in proper adjusted position. Suitable set screws 33 may be employed and extended through the hub portions of the forward and rear feed rollers 15 and 28 to engage the shafts upon which the forward and rear feed rollers are mounted and secure the feed rollers in proper position longitudinally of said shafts, as will be readily understood. Collars 34 are mounted on the rear feed roller shafts 27 to prevent longitudinal movement thereof and a pair of gears 35 are mounted on the right end of the shafts 27 outwardly of the bearings 25 and an intermediate gear 35' meshes with the gears 35. The gear 35' is mounted on the stub shaft 36 carried in the central bearing 25, so that both of the gears 35 will be rotated in the same direction. A suitable belt pulley 37 is mounted on one of the forward feed roller shafts 14 while a corresponding belt pulley 38 is mounted on one of the rear feed roller shafts 27. These pulleys 37 and 38 are adapted to receive belts 39 and 40 respectively, which also pass around a driving pulley 41 mounted on the saw carrying shaft 42 which extends transversely of the machine and is mounted in suitable bearings on supporting brackets 43, 44, and 45. The supporting brackets 43, and 44 are mounted on main portions of the main or lower frame 1 to the left of the longitudinal center thereof while the supporting bearing 45 is mounted on the removable bearing supporting members 5, to the right of the longitudinal center of the machine, previously described. It will be understood that a suitable pulley 46 is also carried by the saw carrying shaft 42 to receive a belt 47 connected with any suitable driving power, not shown.

A pair of transverse shafts 48 and 49 are mounted on the upper frame 2 in suitable bearings 50 to form supporting means for a forward swinging frame 51 and a rear swinging frame 52. Each of the frames 51 and 52 has a transverse member 53 with a tongue 54 extending at an angle therefrom and having a cable 55 extending therethrough for engagement over a guide pulley or roller 56 mounted on a joist 57 above the machine and then connected with an operating lever 58, by means of which the swinging frames 51 and 52 may be readily raised or lowered by an operator standing in front of the machine and within reach of whom the levers 58 are positioned. Each of the swinging frames 51 and 52 also has a shaft 59 mounted transversely in its lower end and carrying a pressure roller 60 corresponding in form to the feed rollers, previously mentioned but of increased size. The pressure rollers 60 have reduced central portions and flared end portions 61 with the pointed log engaging members 62 extended through said flared end and toward the central portions thereof, as shown in the drawings. The pointed log engaging members 62 have suitable nuts 63 upon the inner end portion 61 of the pressure rollers 60 so that the pointed members may be readily adjusted. The pressure rollers 60 carry hub portions 65 within the flared ends 61 thereof so that set screws 66 or the like may be employed for holding the pressure rollers 60 against longitudinal movement upon the shafts 59 provided therefor.

It will therefore be seen that the pressure rollers 60 may be readily raised or lowered to provide for proper contact thereof with logs passing longitudinally through the machine, as will be later fully described.

Mounted on the saw carrying shaft 42 are the circular saws 66 having their oppositely extended hub portions 68 and 69, the hub portions 68 being of substantially frustoconical form and directed toward one another, so that the portions 68 will limit movement of the saws 66 toward one another, as clearly shown in the drawings, particularly Figure 4. The outwardly extended hub portions 69 are provided with annular grooves 70 which are of substantially rectangular form in cross section, thereby providing three right angled walls for each groove 70. The saws 66 are rigid with their hub portions 68 and 69 and adapted to be moved therewith longitudinally of the saw carrying shaft 42, toward and away from one another. The saws 66 move in unison with the shaft 42. In order to move the saws toward and away from one another upon the saw carrying shaft 42, I have provided strap or shifting members 71 having upward offset portions 72 which rest in the grooves 70. Forward and rear rack bars 73 have longitudinal ribs 74 on their under faces which ride in channels 75 of the supporting guide bars or tracks 76 suspended transversely beneath the main frame 1 on suitable supporting brackets 77, as clearly shown in Figure 7. The rack bars 73 have transverse rack teeth 78 on their upper surfaces and extended L-shaped plates 79 fastened at 79ª to the inner end portions. Two of the plates 79 have L-shaped plates 79ᵇ secured thereto and secured to the adjacent bars 73 by the aforesaid fastening 79ª. Horizontally disposed bars 80ª are fastened to the upstanding portions of plates 79ᵇ by bolts 81 and bolts or rivets 80ᵇ pass through the bars 80ª and loops 80ᶜ of the adjacent shifting or strap member 71 which are interposed between said bars 80ª. The other shifting member 71 has its terminals as at 71ª directly bolted or fastened to the adjacent plates 79 (see Figures 8 to 10). Two of the upstanding portions of plates 79 terminate in kerf spreaders or separating fingers 84 while the upstanding portions of the remaining plates 79 form ears 80. One of the bolts 81 passes through one ear 80 and secures a pair of saw guiding fingers 82 thereto. Another pair of saw guiding fingers 82 is fastened as by a bolt 81ª to the other ear 80. Fingers 82 have their free ends on opposite sides of the saws 66 and carry small bearings 83 to contact with the side faces of the saws 66 to the minimum. It will also be evident that the separating fingers 84 will at all times be positioned rearwardly of the saws 66.

In order to move the rack bars 73 transversely of the machine and thereby adjust the relative positions of the saws 66 and the separating fingers 84, I have provided a pair of longitudinally extended side shafts 85 which are rotatably mounted in suitable bearings 86 mounted on the corners of the main frame 1 and which shafts 85 have pinions 87 mounted thereon and engaging the rack teeth 78 on the rack bar 73, to move these rack bars 73 transversely upon rotation of the longitudinal side shafts 85. It will be understood that the pinions 87 have hub portions 88 and set screws 89 extended through said hub portions by means of which the pinions 87 may be readily secured in adjusted position longitudinally of the longitudinal side shafts 85. It will also be understood that suitable stop collars 90 are mounted on the shafts 85 and secured in position by set screws 91 or the like to prevent longitudinal movement of the shafts 85. Each longitudinal shaft 85 has a wheel 93 mounted thereon adjacent its forward end and secured to the shaft by suitable set screws 94 passed through the hub extensions 95 of the wheel 93. A suitable handle 96 may be carried by each wheel 93, and each of said wheels 93 is provided with a circumferential or annular groove 97 within which is engaged a spring 98 projecting from a pin 99 projecting forwardly from the forward extension of the main frame 1, as clearly shown in the drawings. It will be seen that the springs 98 serves to retain the wheels 93 against rotation and thereby prevent accidental movement of the saws 66 and the fingers 84 transversely of the machine.

Suitable pulleys 100 may be mounted on the side shafts 85, if desired, to receive operating belts extended from a suitable source of power for rotating the shafts 85, if desired.

Attention may be called to the fact that the small pieces 82 of soft metal such as babbitt for contacting with the sides of the saws 66 are positioned in substantially V-shaped pockets or recesses 82′ of the saw guide fingers 82.

The spreading fingers 84 are preferably curved slightly toward the saws 66, as shown in Figure 3 and are also of substantially V-shape in cross section, having their narrow rounded edges extended toward the saws 66, as indicated by the numeral 84′ while their rear wide transversely curved longitudinal edges 84″ are extended away from the saws 66. This will permit the spreading fingers 84 to enter the slits formed by the saws 66 and gradually spread the separated parts of the log as the same passes through the machine, and by forming the spreading fingers 84 in the manner described, danger of the fingers catching in the log and interfering with the operation of the machine will be reduced to a minimum.

From the foregoing paragraphs taken in connection with the accompanying drawing it will be seen that I have provided a flitch machine which will cut a log on both sides as it is passed in one direction through the machine, thereby providing a flitch or two sided lumber member with one operation of the machine and one movement of the log through the machine without the necessity of reversing any of the parts to complete the operation. The complete operation is also performed in the minimum length of time and much less time is required to produce a flitch or two sided lumber by the present means.

While the preferred embodiment of the invention has been shown and described, it will be understood that minor changes in the details of construction and arrangement of parts may be resorted to within the scope of what is claimed without departing from the spirit of the invention.

What is claimed is:—

1. A sawing machine having a rotary saw, a slidable bar disposed in advance of the saw, a slidable bar parallel with said bar and disposed to the rear of the saw, plates rising from said bar, a shifting strap member, said shifting strap member spanning said plates, means securing said shifting strap member to said plates, said saw having a hub provided with a groove, said shifting member having an offset portion disposed in said groove, guide fingers for the saw on the first mentioned bar, a separator on the other bar substantially in line with the saw, and means common to and adapted to operate said bars in unison.

2. A sawing machine having rotary sawing means, a bar disposed in advance of the sawing means, a bar disposed in the rear of the sawing means, shifting means rigid with both of said bars and spanning the same and operatively connected to the sawing means, guiding means for the sawing means, said guiding means being carried by the first mentioned bar, a spreader carried by the other bar substantially in line with the sawing means, and means common to and adapted to operate both bars in unison.

3. A sawing machine having a rotary saw provided with a hub, said hub having a groove, a bar disposed in advance of the saw, a bar disposed in the rear of the saw, a shifting strap means rigid with both of said bars spanning the same and operatively coacting with said groove, guiding means for the saw carried by the first mentioned bar outwardly of said shifting strap, a spreader carried by the other bar substantially in line with the saw and outwardly of the shifting strap, and means common to and adapted to operate said bars in unison.

4. A sawing machine having rotary sawing means, a bar disposed in advance of the sawing means, a bar disposed in the rear of the sawing means, shifting means rigid with both of said bars and spanning the same and operatively connected to the sawing means, guiding means for the sawing means, said guiding means being carried by the first mentioned bar, a spreader carried by the other bar substantially in line with the sawing means, and means common to and adapted to operate both bars in unison consisting of a manually operable shaft, pinions on said shaft, said bars having rack teeth in mesh with said pinions.

5. A sawing machine having rotary sawing means, a bar disposed in advance of the sawing means, a bar disposed in the rear of the sawing means, shifting means rigid with both of said bars and spanning the same and operatively connected to the sawing means, guiding means for the sawing means, said guiding means being carried by the first mentioned bar, a spreader carried by the other bar substantially in line with the sawing means, means common to and adapted to operate both bars in unison consisting of a manually operable shaft, pinions on said shaft, said bars having rack teeth in mesh with said pinions, a drive shaft along which the saw means is slidable, said shaft being parallel to and intermediate said bars, and a driving connection for said drive shaft intermediate said bars.

6. A sawing machine having rotary sawing means, a bar disposed in advance of the sawing means, a bar disposed in the rear of the sawing means, shifting means rigid with both of said bars and spanning the same and operatively connected to the sawing means, guiding means for the sawing means, said guiding means being carried by the first mentioned bar, a spreader carried by the other bar substantially in line with the sawing means, and means common to and adapted to operate both bars in unison, a drive shaft for the sawing means, rollers to move the work relative to the sawing means, and means to drive said rollers from the drive shaft and in unison with the sawing means.

In testimony whereof I affix my signature in presence of two witnesses.

GEORGE M. GOETHE.

Witnesses:
LEE M. BOOTH,
LOUISE STEMPLE.